US006954896B1

(12) United States Patent
Dodrill et al.

(10) Patent No.: US 6,954,896 B1
(45) Date of Patent: Oct. 11, 2005

(54) BROWSER-BASED ARRANGEMENT FOR DEVELOPING VOICE ENABLED WEB APPLICATIONS USING EXTENSIBLE MARKUP LANGUAGE DOCUMENTS

(75) Inventors: Lewis Dean Dodrill, Richmond, VA (US); Satish Joshi, Glen Allen, VA (US); Ryan Alan Danner, Glen Allen, VA (US); Susan Harrow Barban, Midlothian, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 10/422,933

(22) Filed: Apr. 25, 2003

Related U.S. Application Data

(62) Division of application No. 09/559,637, filed on Apr. 28, 2000, now Pat. No. 6,578,000.

(60) Provisional application No. 60/152,316, filed on Sep. 3, 1999.

(51) Int. Cl.[7] .................. G06F 15/00; G06F 3/00; G10L 21/00
(52) U.S. Cl. .............. 715/513; 715/760; 704/270; 704/275; 704/270.1; 705/57; 709/202; 709/203
(58) Field of Search ................ 704/270–275, 704/260, 270.1; 715/513, 760; 705/57; 709/202, 709/203

(56) References Cited

U.S. PATENT DOCUMENTS 4,837,798 A    6/1989  Cohen et al.
5,784,562 A *  7/1998  Diener ..................... 709/203
6,057,835 A    5/2000  Sato et al.
6,067,559 A *  5/2000  Allard et al. ............. 709/202
6,073,143 A    6/2000  Nishikawa et al.

(Continued)

FOREIGN PATENT DOCUMENTS

JP    2001-109741 A  *  4/2001   .......... G06F 17/21

OTHER PUBLICATIONS

IBM (IBM Technical Disclosure Bulletin NNRD42580, "Codeset and Language Information Exchange between Browser and Backend Program for Multi-lingual FORM Data on the Web", Sep. 1999).*

(Continued)

Primary Examiner—Vijay B. Chawan
(74) Attorney, Agent, or Firm—Leon R. Turkevich

(57) ABSTRACT

A unified web-based voice messaging system provides voice application control between a web browser and an application server via an hypertext transport protocol (HTTP) connection on an Internet Protocol (IP) network. The application server executes the voice-enabled web application by runtime execution of a first set of extensible markup language (XML) documents that define the voice-enabled web application to be executed. The application server generates an HTML form specifying selected application parameters from an XML document executable by the voice application. The HTML form is supplied to a browser, enabling a user of the browser to input or modify application parameters for the corresponding XML document into the form. The application server inserts the received input application parameters into the XML document, and stores the document.

14 Claims, 7 Drawing Sheets

U.S. PATENT DOCUMENTS

| | | | | |
|---|---|---|---|---|
| 6,085,161 A | * | 7/2000 | MacKenty et al. | 704/270 |
| 6,088,675 A | * | 7/2000 | MacKenty et al. | 704/270 |
| 6,253,193 B1 | * | 6/2001 | Ginter et al. | 705/57 |
| 6,269,336 B1 | | 7/2001 | Ladd et al. | |
| 6,336,214 B1 | * | 1/2002 | Sundaresan | 715/513 |
| 6,345,292 B1 | * | 2/2002 | Daugherty et al. | 715/513 |
| 6,446,040 B1 | * | 9/2002 | Socher et al. | 704/260 |
| 6,490,564 B1 | | 12/2002 | Dodrill et al. | |
| 6,535,896 B2 | * | 3/2003 | Britton et al. | 715/513 |

OTHER PUBLICATIONS

Bos, "XML in 10 Points", W3.org (Aug. 26, 1999).

Hartman et al., "VoiceXML Builder: A Workbench for Investigating Voiced-Based Applications", 31$^{st}$ Annual Frontiers in Education Conference, Oct. 2001.

Danielsen, "The Promise of a Voice-Enabled Web", article in Computer magazine, pp. 104-106, Aug. 2000.

* cited by examiner

```
<?xml vesion="1.0"?>
<!DOCTYPE DOCUMENT [
<!ELEMENT DOCUMENT (Menu Variables,Options)>
<!ELEMENT Menu Variables (#PCDATA)*>
<!ATTLIST Menu Variables name CDATA #REQUIRED
                        value CDATA #REQUIRED>
<!ELEMENT Options      (#PCDATA)*>
<!ATTLIST Options name CDATA #REQUIRED
                 value CDATA #REQUIRED
                 text CDATA #IMPLIED>           ⟵─110
]>
<DOCUMENT>
<Menu Variables name="MenuName"           value="Main Menu"/>        ← 106b
<Menu Variables name="DefaultPrompt"  ─ 106c
  value="AUD_MAIN_MENU_PROMPT.wav"/>
<Menu Variables name="Components"    value=""/>          ─ 106d
<Menu Variables name="Conditions"    value=""/>
<Menu Variables name="Fallback"       value="LOGOUT_CLEANUP.xml"/>
<Menu Variables name="Type"           value="MENU"/>   ─ 106e
<Menu Variables name="InputMask"      value="StandardMenu"/>  ─ 106f
<Menu Variables name="Images"         value=""/>  ─ 106g    ─ 106a
<Menu Variables name="Text"  ─ 114a₁  value="To get your messages,
  press1. To logout, press *9"/>    ─ 114a₂    ─ 114a₃
<Options name="1"  value="MENU=:ACT_GET_VOICE_MESSAGES.xml"
  text="Access your messages."/>  ─ 114b₂      ─ 114b₃
<Options name="2"  value="SOUND:AUD_MAIN_MENU_HELP.wav"
  text=:Access your messages."/>  ─ 114b₁
<Options name="*9"      value="DECISION:LOGOUT_CLEANUP.xml"
  text="Send a message."/>  ─ 114c₁   ─ 114c₂   ─ 114c₃
<DOCUMENT>
```

Figure 4

BROWSER-BASED ARRANGEMENT FOR DEVELOPING VOICE ENABLED WEB APPLICATIONS USING EXTENSIBLE MARKUP LANGUAGE DOCUMENTS

This application is a divisional of application Ser. No. 09/559,637, filed Apr. 28, 2000 now U.S. Pat. No. 6,578,000, incorporated in its entirety herein by reference.

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache-based software available from The Apache Software Foundation, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. In particular, commonly-assigned, copending application Ser. No. 09/501,516, filed Feb. 1, 2000 entitled Arrangement for Defining and Processing Voice Enabled Web Applications Using Extensible Markup Language Documents, the disclosure of which is incorporated in its entirety herein by reference, discloses an arrangement for defining a voice-enabled web application using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment.

Hence, the XML document described in the above-incorporated application Ser. No. 09/501,516, which can be written using a conventional editor or word processor, defines the application to be executed by the application server within the runtime environment, enabling voice enabled web applications to be generated and executed without the necessity of programming language environments.

Conventional application development environments maintain a substantial distinction between application use and application development. In particular, most applications are developed either by writing source code using a conventional programming language and compiling the written code into executable format, or using a stand-alone development tool that generates the required application. After the application has been developed into executable code, the executable code is then executed by a processing system for testing prior to actual use by subscribers. The distinction between application use and application development hinders efficiency in application development, since a developer is unable to obtain immediate feedback from adding any changes to an application. Hence, an application developer having discovered an undesirable result in the application during execution typically needs to retrace the executable code to locate the cause of the undesirable result, slowing the application development process.

SUMMARY OF THE INVENTION

There is a need for an arrangement that enables a user to develop voice enabled web applications using a browser, where the user can concurrently generate new voice application operations and test the voice application operations executed by an application server.

There also is a need for an arrangement that enables voice applications to be defined using extensible markup language (XML) documents in a manner that provides flexible control of the voice applications. In particular, there is a need for an arrangement that enables the modification of existing application parameters of a voice-enabled web application, or the addition of new application parameters, without affecting unmodified application parameters.

These and other needs are attained by the present invention, where an application server that executes a voice application defined by XML documents dynamically generates an HTML form specifying selected application parameters from an XML document executable by the voice application. The HTML form is supplied to a browser, enabling a user of the browser to input or modify application parameters for the corresponding XML document into the form. The application server, upon receiving the form from the web browser, inserts the input application parameters into the XML document, and stores the application document for execution. Since voice applications are executed by the application server based on runtime parsing of the XML document, a user can concurrently use the HTML form to create or modify an XML document, post the HTML to the application server, and then execute the XML document to validate the inputs supplied to the HTML form. Hence, a user can easily generate XML documents and verify the corresponding voice application operation using a forms-based application development methodology.

One aspect of the present invention provides a method in an application server for developing an executable voice application. The method includes generating a hypertext markup language (HTML) document that specifies a form having at least one entry field for specifying an application parameter, and sending the HTML document to a web browser. The method also includes receiving the form from the web browser, the received form having an input application parameter in the entry field, inserting the input application parameter into an extensible markup language (XML) document configured for defining an operation of the executable voice application, and storing the XML document for execution by the application server. Generation of an HTML document that specifies a form for entry of application parameters enables an application developer to use an HTML forms representation of the application defining XML documents. Hence, an application developer can develop an XML-based voice web application without the necessity of any experience in writing code in existing programming languages. Moreover, the application developer can use a browser to create or modify a voice enabled web application; consequently, the request-based interaction between the browser and the application server enables an application developer to create or modify an XML document, and then cause the application server to execute the XML document in the same browser window.

Another aspect of the present invention provides a method in a browser for developing an executable voice application. The method includes sending a first request to a web server according to hypertext transport protocol (HTTP) for a first hypertext markup language (HTML)-based web page having a form with at least one entry field for inputting an application parameter, receiving and displaying the form, and posting the form, including an input application parameter in the entry field that is input by a user, to a prescribed uniform resource locator (URL). The method also includes sending a second request to the web server for execution of the executable voice application based on the posted form, and receiving a second HTML-based web page having voice application content based on the posted form. The posting of the form having the input application parameter enables a user of the browser to supply application parameters to an application server to define voice application operations in an XML document. Moreover, the sending of a second request for execution of the executable voice application based on the posted form and reception of the corresponding second HTML-based web page enables a user to personalize voice application operations within a voice enabled web application, and then test the input changes by obtaining the results of execution of the voice enabled web application by the application server.

Still another aspect of the present invention provides a system configured for developing an executable voice application. The system includes a computer-based server and a storage medium. The computer-based server has an application runtime environment configured for generating for a browser a first hypertext markup language (HTML) document that specifies a form having at least one entry field for specifying an application parameter. The application runtime environment, in response to reception from the browser of a first HTTP request specifying the application parameter, inserts the application parameter specified by the first HTTP request into an XML document. The application runtime environment also selectively executes the XML document having the application parameter specified by the first HTTP request in response to a second HTTP request. The storage medium is configured for storing the XML document created or modified by the computer-based server.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 4 is a diagram illustrating an XML document configured for defining a voice application operation for the application server of FIGS. 1, 2 and 3.

BEST MODE FOR CARRYING OUT THE INVENTION

Figure 1:
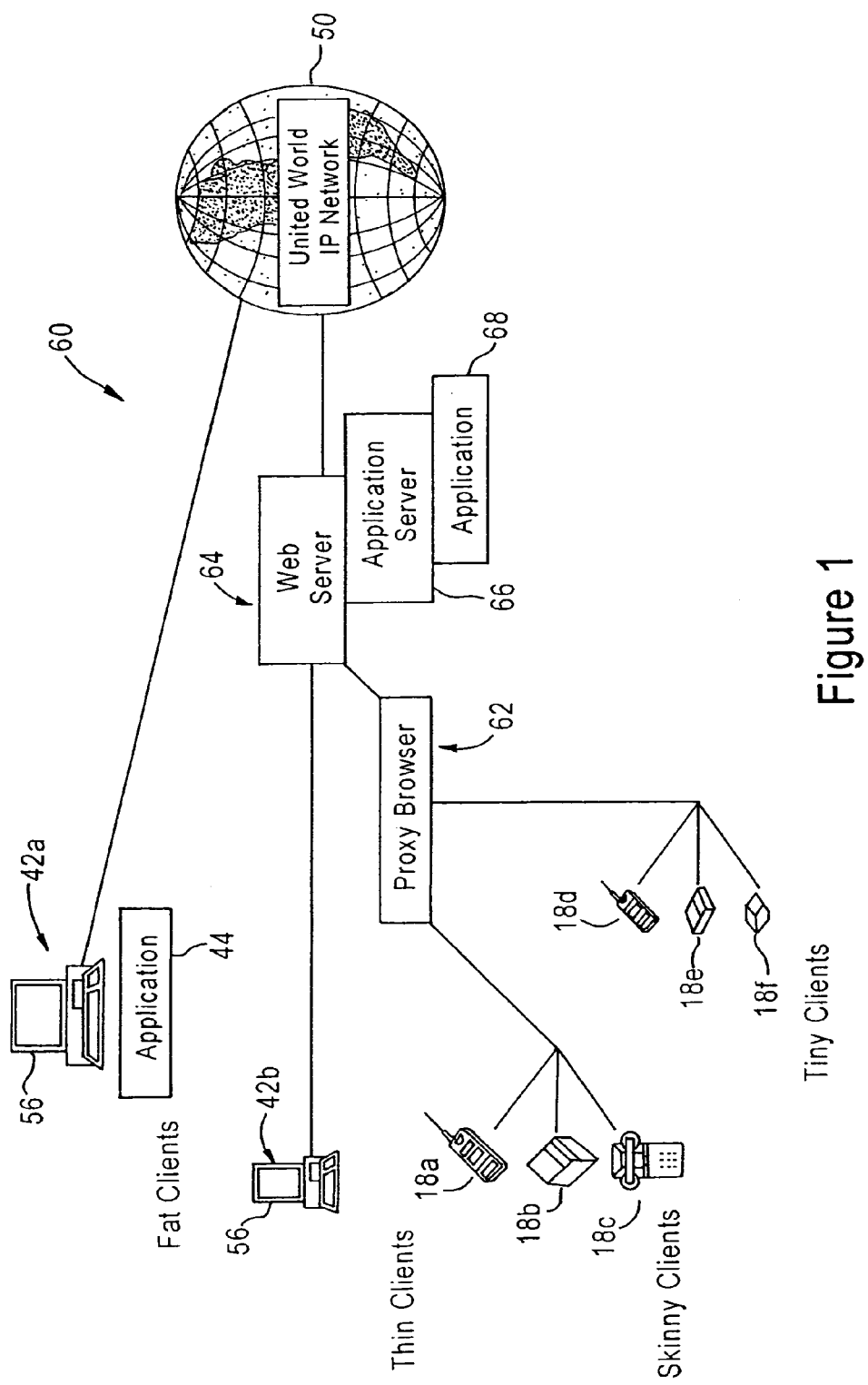
FIG. 1 is a block diagram illustrating an system enabling a forms-based development of voice enabled web applications according to an embodiment of the present invention.
Figure 3:
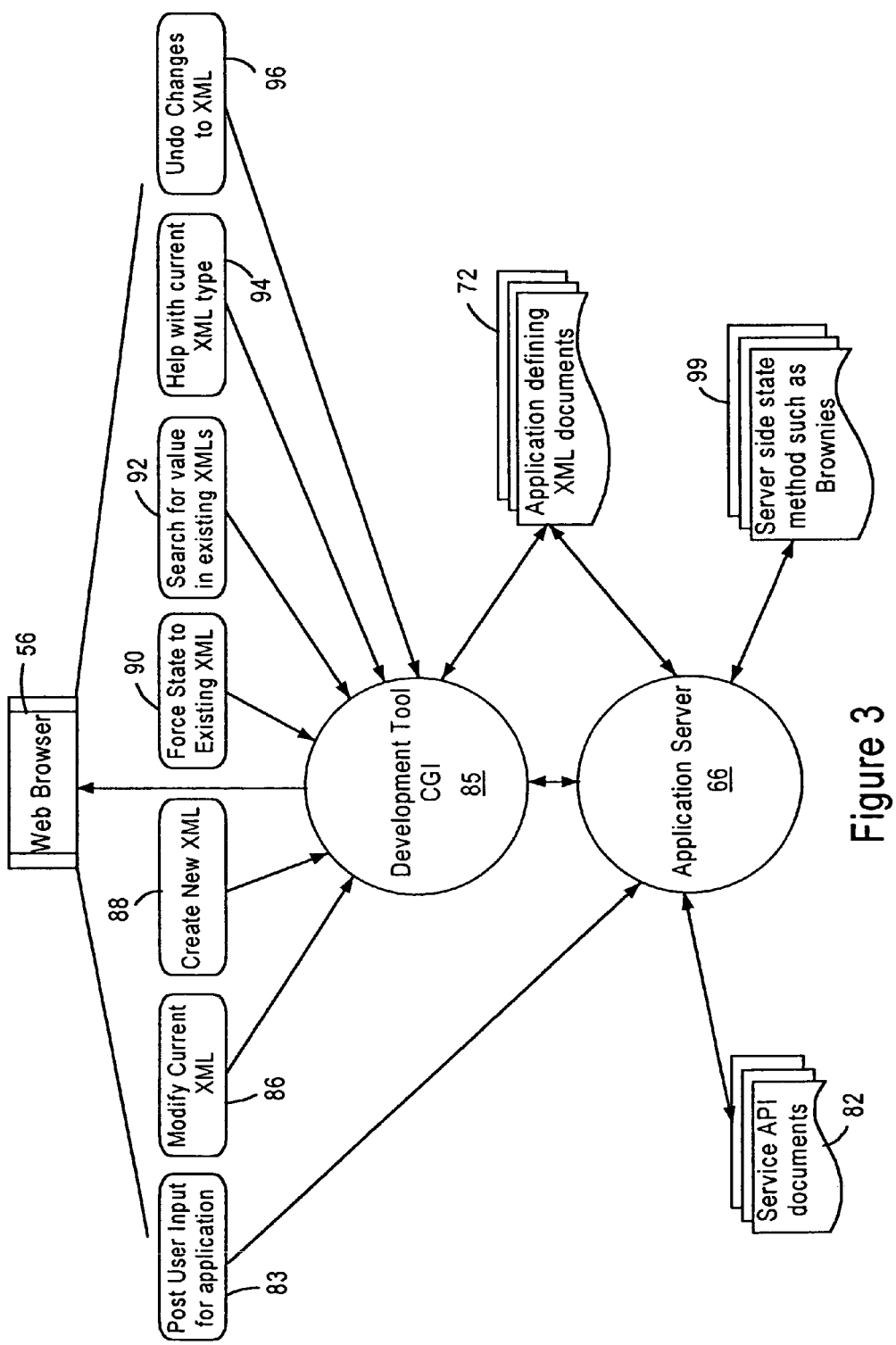
FIG. 3 is a diagram illustrating functional interactions between the browser and application server of FIG. 1 for development of voice enabled web applications according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/501,516. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser.

As described above, conventional application development techniques involving writing application code using a conventional word processor require a user to have familiarity with executable code syntax. Although use of XML documents to define voice application operations eliminates the necessity of writing programming code, use of a conventional word processor for development of the XML documents still requires the application developer to have substantial knowledge of XML syntax, limiting the ability of a typical user lacking expertise in application development or XML syntax to personalize a voice application.

According to the disclosed embodiment, a browser-based executable voice application defined by XML documents can be created or modified by users lacking expertise in application development or XML syntax by use of the forms based representation of the application defining XML documents. In particular, the application server 66 is configured for providing an HTML forms representation of the application defining XML documents. The application server 66 is configured for parsing an existing XML document that defines a voice application operation, inserting selected XML tag data that specify application parameters into entry fields of an HTML-based form, and outputting the HTML based form to the browser 56. The browser 56, upon receiving the HTML document having the form specifying entry fields for application parameters for the XML document, displays the form in a manner that enables a user of the voice application to create or modify voice application operations. After the user has input new application parameters or modified existing application parameters in the entry fields, the user submits the form to a prescribed URL that is recognized by the application server 66. The application server 66, upon receiving the form from the corresponding web browser 56, can then create or modify the XML document by inserting the input application parameters as XML tag data in accordance with XML syntax. The application server 66 can then store the XML document for later execution for the user.

Hence, a user can develop or modify a voice enabled web application executable by the application server 66 by accessing forms generated by the application server 66. In addition, the stateless nature of the application server 66 enables the user to simultaneously develop and use the web voice application by posting the form for modifying the XML document to the application server 66, followed by a request to application server for execution of the voice application operation corresponding to the XML document modified by the posted form.

Figure 2:
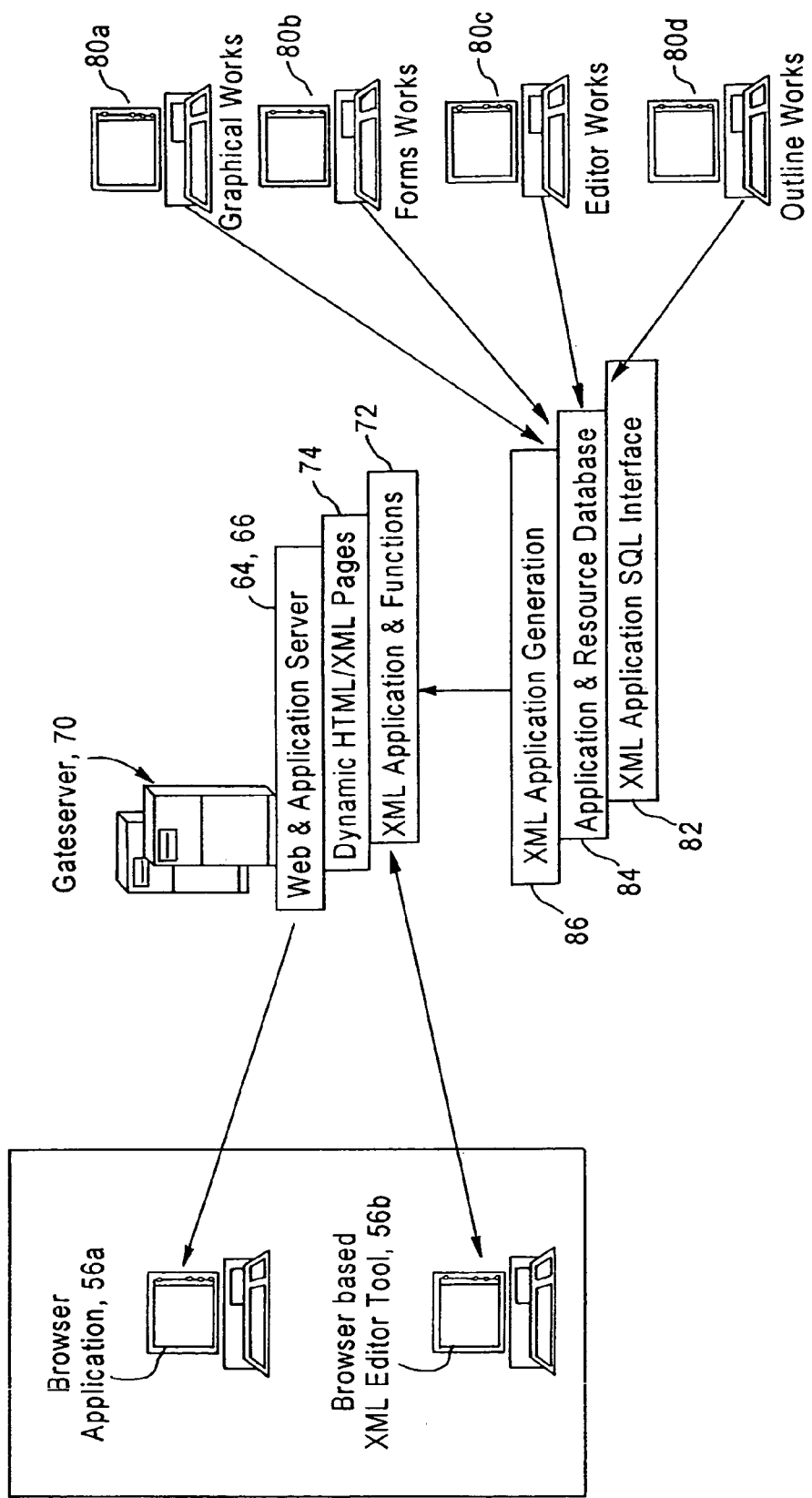
FIG. 2 is a diagram illustrating development tools usable for development of the voice enabled web applications.

FIG. 2 is a diagram illustrating development tools usable for development of the voice enabled web applications. As shown in FIG. 2, the web server 64, the application server 66, and the XML pages used to define the voice web applications ("XML applications and functions 72") reside within a gateserver 70. The gateserver 70 provides HTTP access for a browser based XML editor tool 56b that enables a web programmer to design voice applications by editing XML pages. The XML pages are stored as XML applications and functions 72, for example within a database accessible by the application server 66. The XML pages stored within the XML application and functions database 72 define the actual application operations to be performed by the application server 66 in its application runtime environment. Hence, the application server 66 executes stored XML applications and functions 72, and in response generates dynamic HTML pages having XML tags, also referred to as HTML/XML pages 74.

Four types of XML documents are used by the application server 66 to execute web applications: menu documents, activity documents, decision documents, and "brownies". The menu documents, activity documents, and decision documents are XML documents, stored in the document database 72, that define user interface and boolean-type application logic for a web application, hence are considered "executable" by the application server 66. The brownie document, stored in a separate registry 99 in FIG. 3, is an XML data record used to specify application state and user attribute information for a given XML application during a user session. Hence, the XML documents define user interface logistics and tie services and application server events together in a meaningful way, forming a coherent application or sets of applications. Additional details regarding the definition of executable voice applications using XML documents are described in the above-incorporated application Ser. No. 09/501,516.

Certain development tools having direct access to the application server 66 can be used to establish context information used by the application runtime environment within the application server 66 for execution application operations based on parsing of XML documents. In particular, development tools such as a graphic based development system 80a, a forms-based development system 80b, an editor-based development system 80c, or an outline-based development system 80d may be used to define XML tags and procedure calls for the application runtime environment. The development tools (e.g., 80a, 80b, 80c, or 80d) maybe used to establish an application and resource database 84 to define low-level operations for prescribed XML tags, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag.

The development tools (e.g., 80a, 80b, 80c, or 80d) may be used to establish an application programming interface (API) library 82 (e.g., a SQL interface) for the application runtime environment, enabling the application server 66 to issue prescribed function calls to established services, such as Internet Message Access Protocol (IMAP), Lightweight Directory Access Protocol (LDAP), or Simple Mail Transfer Protocol (SMTP). The library 82 may be implemented as dynamically linked libraries (DLLs) or application programming interface (API) libraries. If desired, the development tools (e.g., 80a, 80b, 80c, or 80d) may also be used to generate an XML application as a stored text file 86, without the use of the forms generated by the application server 66, described below.

FIG. 3 is a diagram illustrating functional interactions between a web browser 56 (e.g., the browser application 56a of FIG. 2) and the application server 66 according to an embodiment of the present invention. A user of the browser 56 can send a request to the application server 66 (via the web server 64) for a voice application operation 83, for example using the browser-based interface of FIG. 5B, for accessing new voice mail messages, new facsimile messages, new e-mail messages, and the like. According to the disclosed embodiment, a user of the browser 56 also can send a request to the application server 66 for creating or modifying an XML document defining a voice application operation, via a development tool common gateway interface (CGI) 85. In particular, the web browser 56 posts a user input for an application operation (i.e., an HTTP request) to a first URL for the voice application operation 83. In contrast, the web browser 56 posts to another URL for accessing the development tool CGI 85. Accessing the application server via the CGI 85 enables the application server 66 to access a selected XML document, for example the XML document 100 illustrated in FIG. 4, in order to dynamically generate a form 102, illustrated in FIG. 5A, that specifies selected application parameters of the XML document 100. Hence, accessing the application server by posting the user input according to the request 83 causes execution of the XML document 100, whereas accessing the application server via the CGI 85 causes the application server 66 to generate a form that specifies the contents of the XML document 100.

As illustrated in FIG. 3, accessing the application server 66 via the CGI 85 enables the web browser to perform different operations on the selected XML document 100. For example the browser 56 may issue a request 86 for modifying the selected XML document, a request 88 for creating a new XML document, a request 90 for forcing the application state of a user to the selected XML document (effectively overriding the stored application state specified by the brownie in the brownie registry 99), a request 92 for searching for a value in the existing XML documents, a request 94 for help with the current XML document type, or a request 96 to undo changes. Hence, the application server 66 is configured for executing a corresponding operation for the selected XML document based on the request received from the CGI 85.

Figure 5A:
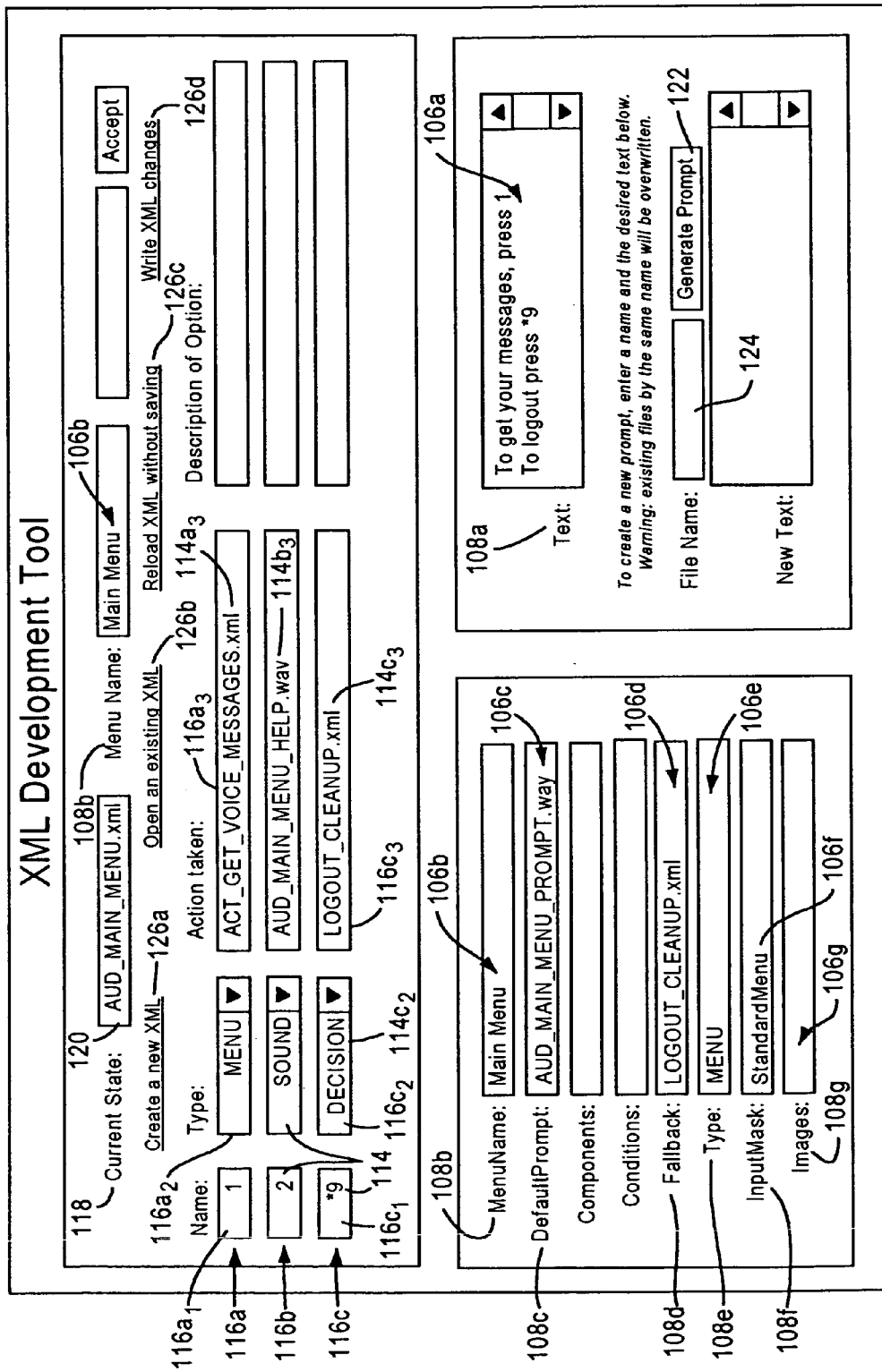
FIGS. 5A and 5B are diagrams illustrating a browser display of a form for user entry of voice application parameters, and a voice application user interface, respectively.
Figure 6:
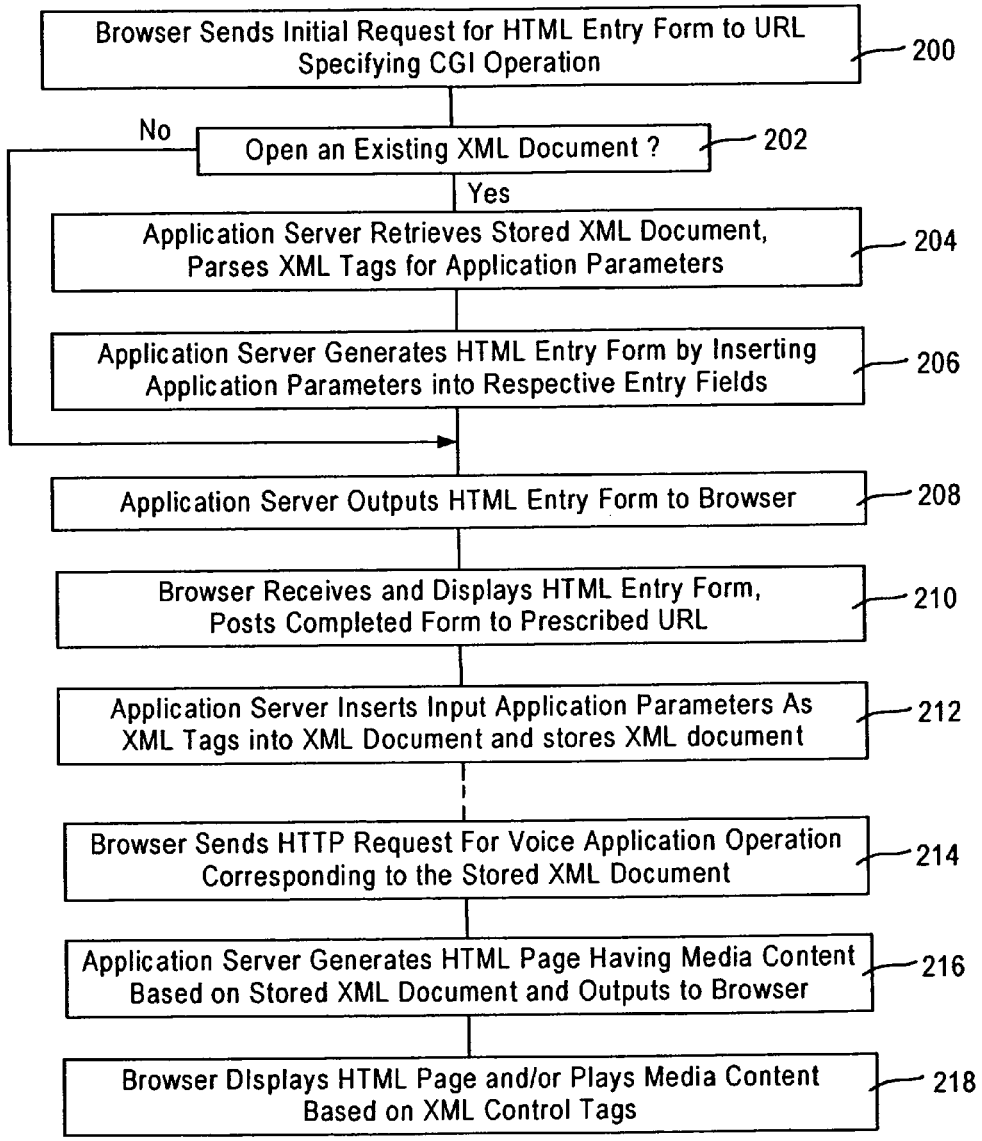
FIG. 6 is a diagram illustrating the method for developing an executable voice application according to an embodiment of the present invention.

FIG. 6 is a flow diagram illustrating the method of developing an executable voice application according to an embodiment of the present invention. The steps described in FIG. 6 can be implemented as executable code stored on a computer readable medium (e.g., a hard disk drive, a floppy drive, a random access memory, a read only the memory, an EPROM, a compact disc, etc.), where steps to be executed by the application server 66 and the browser 56 are stored on computer readable media accessible by the application server 66 and the web browser 56, respectively. The method begins in step 200, where the browser 56 sends an initial request to a URL specifying the CGI 85 for one of the requests 86 through 96. The application server 66, in response to receiving the request via the CGI 85, determines in step 202 whether the request requires opening an existing XML document 100 stored in the database 72, or whether the request is for creation of a new XML document (e.g., request 88). Assuming that the CGI request requires opening the existing XML document 100, the application server 66 retrieves in step 204 the selected XML document 100 from the database 72, and parses the XML document 100 for XML tags (e.g., 104a, 104b, etc.) that specify application parameters (e.g., 106a, 106b, etc.). The application server 66 then generates in step 206 the HTML tags necessary for generation of the entry form 102 by the browser 56, illustrated in FIG. 5A, by inserting the application parameters (e.g., 106a, 106b, etc.) into respective entry fields (e.g., 108a, 108b, etc.).

FIG. 5A illustrates the insertion of the application parameters (e.g., 106a, 106b, 106c, 106d, 106e, 106f, etc.) into respective entry fields (e.g., 108a, 108b, 108c, 108d, 108e, 108f, etc.) by the application server 66 for display of the form 102 by the browser 56. As shown in FIG. 5A, the application server 66 parses the XML tags 104a, 104b, 104c, . . . 104g and in response inserts the application parameters 106a, 106b, 106c, . . . 106g into the respective entry fields 108a, 108b, 108c, . . . 108g. For example, the application server 66, in response to detecting the XML text tag 104a, dynamically generates an HTML document that specifies a form 102 having the entry field 108a and including the corresponding application parameter 106a; hence, each of the XML tags (e.g., 104a, 104b, 104c, 104d, 104e, etc.) has a corresponding entry field (e.g., 108a, 108b, 108c, 108d, 108e, etc.) within the form 102 specified by the HTML page generated by the application server 66, including XML tags 108g having empty application parameters 106g. Note that XML tags 110 used to define the XML document attributes (and consequently the structure of the form 102) are predefined by one of the developer workstations (e.g., 80a, 80b, 80c, or 80d) or the browser based XML editor tool 56b that do not rely on the form 102.

The application server 66 also parses the XML option tags 112 for insertion of menu application parameters into the respective menu entry fields. For example, the application server 66 inserts the menu application parameters $114a_1$, $114a_2$, and $114a_3$ into the respective menu entry fields $116a_1$, $116a_2$, and $116a_3$, and inserts the menu application parameters $114c_1$, $114c_2$, and $114c_3$ into the respective menu entry fields $116c_1$, $116c_2$, and $116c_3$ generated by the HTML document in step 206.

The application server 66 also specifies an entry field 118 that enables the browser user to specify the filename 120 of the XML document (i.e., the designation used by the application server 66 when referring to the "current state"). In addition, the application server 66 specifies an addition button 122 that enables users to add menu options 112 to an XML document; hence, if the user enters a new file name within the entry field 124 and presses the addition button 122, the browser 56 posts to a prescribed URL to cause the application server to generate a new XML document having a name specified in the field 124, and to generate another HTML form having an additional menu entry field 116 for the new prompt.

The application server also specifies within the HTML form 102 prescribed URLs associated with command hyperlinks 126, such that posting the form 102 by the browser 56 to a corresponding one of the URLs 126 results in a corresponding operation (e.g., as illustrated as operations 86 through 96 in FIG. 3) performed by the application server 66.

Hence, the HTML entry form 102 generated by the application server 66 in step 206 of FIG. 6 provides all the fields and command functions necessary for a user to create or modify a new or existing XML document, regardless of whether the XML document is a menu-based XML document or a non-menu XML document.

The application server 66 then outputs the HTML entry form 102 to the browser 56 in step 208 across an HTTP connection. The browser 56 receives and displays the HTML form 102 in step 210, enabling the user to edit the application parameters specified within the entry fields (e.g., 108a, 108b, etc., 116a, 116b, etc., or 118). In response to detecting the user pressing one of the form buttons or one of the command hyperlinks 126, the browser 56 posts the completed form to a prescribed URL, for example the URL specified by the corresponding command hyperlinks 126. As described above, the URL will specify an address for the application server 66 via the development tool CGI 85.

The application server 66, in response to receiving the completed form 102, inserts the input application parameters into the appropriate XML tags of the XML document specified by the name field 118, and stores the XML document within the XML document database 72 in step 212.

Hence, the above-described arrangement enables a user lacking programming skills or knowledge of XML syntax to develop voice-enabled web applications defined in XML documents, by specifying application parameters using the form 102 generated by the application server 66. In addition, the stateless nature of the application server 66 enables a user to edit any application-defining XML document, including an XML document that is executed by the application server 66 during an existing user session, since any changes to the XML document made by the user using the form 102 are transparent to the application runtime environment executing the XML document.

Figure 5B:
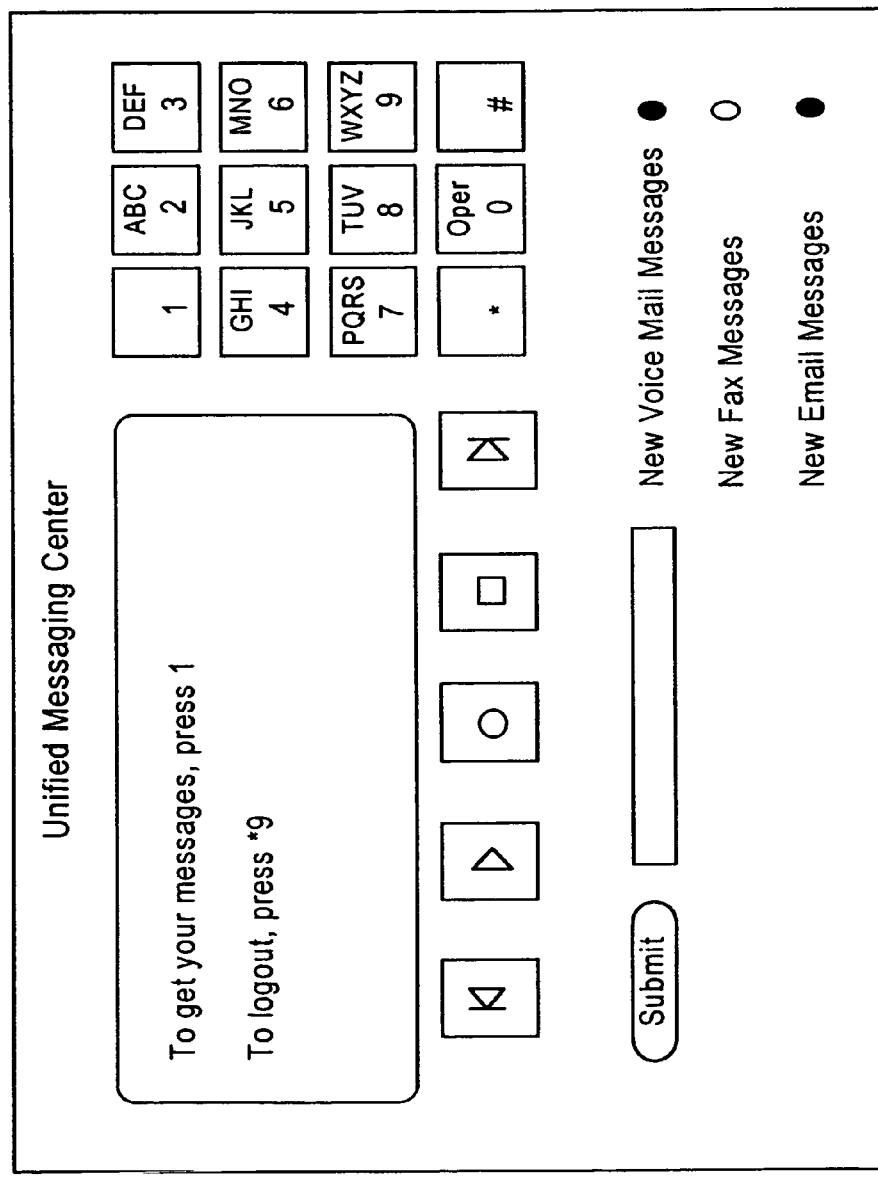

In particular, FIG. 5B is a diagram illustrating a user interface form 130, dynamically generated by the application server 66 in response to execution of a selected application defining XML document from the XML document database 72. As illustrated in FIG. 6, the browser 56 sends an HTTP request for a voice application operation corresponding to a stored XML document in step 214, corresponding to operation 82 of FIG. 3. The application server 66 generates in step 216 an HTML page having media content based on parsing the XML document corresponding to the request for a voice application operation; for example, the application server 66 may identify the XML document based on the URL specified by the HTTP user request (e.g., that may specify a user session), and also based on application state information determined from the corresponding brownie stored in the registry 99. The HTML page generated by the application server in step 216 specifies HTML tags for generating the user interface form 130, plus media content (e.g., the default prompt "AUD_MAIN_MENU_PROMPT.wav" specified by the parameter 106c) and XML control tags.

The application server 66 then outputs the generated HTML page in step 216, and the browser parses the HTML page 130 to display the text and image content including the user interface form 130, and to play the audio-based media content based on XML control types in step 218. Hence, a user can simultaneously display within the browser 56 the XML development form 102 and the user interface form 130, enabling the user to first create or modify an XML document using the development form 102, post the development form 102 to the application server 66, and then immediately test or validate the modified XML document using the user interface form 130.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system configured for developing an executable voice application, the system including:
   a computer-based server having a means for generating for a browser a first hypertext markup language (HTML) document that specifies a form having at least one entry field for specifying an application parameter, wherein:
   (1) the generating means, in response to reception from the browser of a first HTTP request having the form having said at least one entry field specifying the application parameter, inserts the application parameter specified by the at least one entry field in the first HTTP request into an XML document,
   (2) the generating means selectively executing the XML document and in response performing an application operation based on the application parameter, having been inserted into the XML document from the first HTTP request, in response to a second HTTP request; and
   a storage medium configured for storing the XML document.

2. The system of claim 1, wherein the generating means includes means for sending the first HTML document specifying a blank form for creation of the XML document in response to an initial HTTP request specifying creation of the XML document.

3. The system of claim 2, wherein the generating means includes means for specifying within the blank form a first set of entry fields configured for storing user selection inputs, a second set of entry fields configured for storing respective application responses, and a third set of entry fields configured for storing respective application response types.

4. The system of claim 3, wherein the generating means further includes means for inserting application parameters from the first, second and third set of entry fields, supplied by the first HTTP request, into the XML document.

5. The system of claim 1, wherein the generating means includes means for copying selected XML tag data from the stored XML document into a respective plurality of the entry fields of the first HTML document in response to an initial HTTP request specifying opening of the XML document.

6. The system of claim 5, wherein the generating means includes means for overwriting the selected XML tag data with the application parameters specified by the respective entry fields in the first HTTP request.

7. The system of claim 1, wherein the application parameter is a voice application parameter and the application operation is a voice application operation of the executable voice application.

8. A system configured for developing an executable voice application, the system including:
- a computer-based server having an application runtime environment configured for generating for a browser a first hypertext markup language (HTML) document that specifies a form having at least one entry field for specifying an application parameter, wherein:
  (1) the application runtime environment, in response to reception from the browser of a first HTTP request having the form having said at least one entry field specifying the application parameter, is configured for inserting the application parameter specified by the at least one entry field in the first HTTP request into an XML document,
  (2) the application runtime environment selectively executing the XML document and in response performing an application operation based on the application parameter, having been inserted into the XML document from the first HTTP request, in response to a second HTTP request; and
- a storage medium configured for storing the XML document.

9. The system of claim 8, wherein the application runtime environment is configured for sending the first HTML document specifying a blank form for creation of the XML document in response to an initial HTTP request specifying creation of the XML document.

10. The system of claim 9, wherein the application runtime environment is configured for specifying within the blank form a first set of entry fields configured for storing user selection inputs, a second set of entry fields configured for storing respective application responses, and a third set of entry fields configured for storing respective application response types.

11. The system of claim 10, wherein the application runtime environment is configured for inserting application parameters from the first, second and third set of entry fields, supplied by the first HTTP request, into the XML document.

12. The system of claim 8, wherein the application runtime environment is configured for copying selected XML tag data from the stored XML document into a respective plurality of the entry fields of the first HTML document in response to an initial HTTP request specifying opening of the XML document.

13. The system of claim 12, wherein the application runtime environment is configured for overwriting the selected XML tag data with the application parameters specified by the respective entry fields in the first HTTP request.

14. The system of claim 8, wherein the application parameter is a voice application parameter and the application operation is a voice application operation of the executable voice application.

* * * * *